Figure 1:
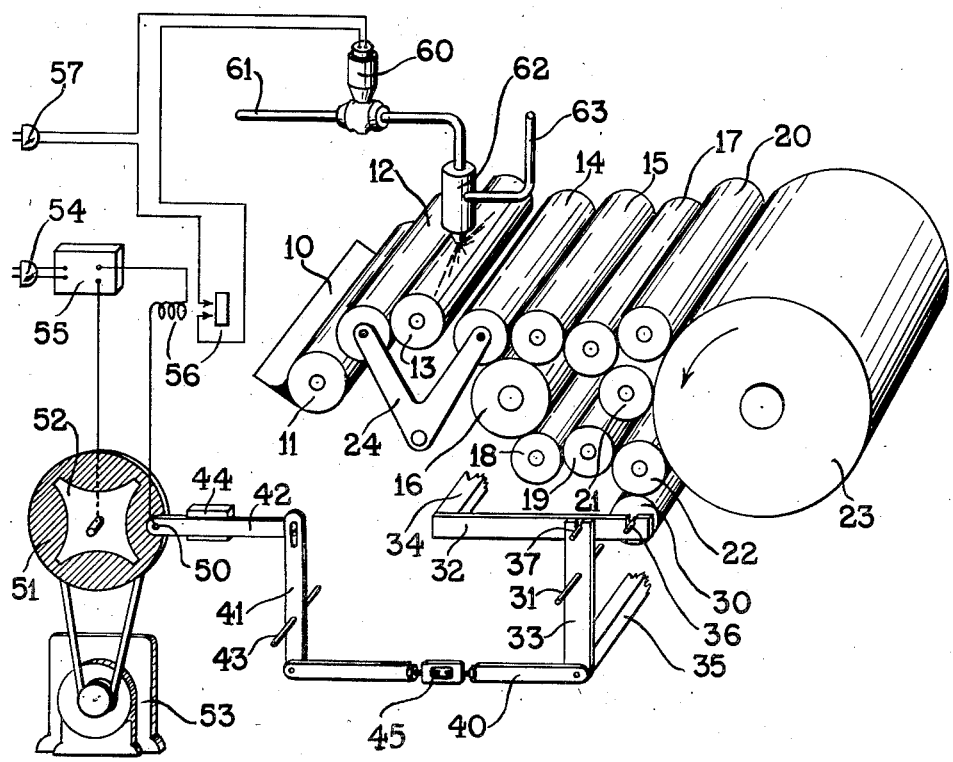

May 10, 1955     D. SMITH ET AL     2,707,916
RHEOLOGICAL CONTROL APPARATUS
Filed May 21, 1951     4 Sheets-Sheet 1

INVENTORS
DANIEL SMITH
DANIEL HURLEY
BY Eric E. Graebe

May 10, 1955  D. SMITH ET AL  2,707,916
RHEOLOGICAL CONTROL APPARATUS
Filed May 21, 1951  4 Sheets-Sheet 2

INVENTORS
DANIEL SMITH
DANIEL HURLEY
BY

May 10, 1955  D. SMITH ET AL  2,707,916
RHEOLOGICAL CONTROL APPARATUS
Filed May 21, 1951  4 Sheets-Sheet 3

INVENTORS
DANIEL SMITH
DANIEL HURLEY
BY Eric E. Franke

INVENTORS
DANIEL SMITH
DANIEL HURLEY ited States Patent Office 2,707,916
Patented May 10, 1955

2,707,916

RHEOLOGICAL CONTROL APPARATUS

Daniel Smith, Riverdale, N. Y., and Daniel Hurley, Newark, N. J., assignors to Interchemical Corporation, a corporation of Ohio Application May 21, 1951, Serial No. 227,302

13 Claims. (Cl. 101—363)

This invention relates to plastic materials and aims to provide an improved method of and apparatus for adjusting the rheological properties of plastic materials in a multi-roller distributing system.

It is a particular feature of this invention that it makes possible the control of the rheological properties of a printing ink in a printing press which is equipped with a multi-roller distributing system.

It has become common practice in the printing industry to use, for typographic printing, inks of the general type disclosed in Gessler Patent No. 2,087,190. Such inks are known as "heat-set" inks. Heat-set inks are formulated by dissolving a resinous material in a solvent which has a low vapor pressure at normal room temperatures but which can be evaporated rapidly at elevated temperatures. Coloring matter, such as a pigment, is dispersed in the solution.

When a heat-set ink is used in a modern high-speed printing press, it must be supplied to the plate in the form of a thin film. This is accomplished by feeding the ink from an ink fountain to the plate cylinder through a distributing system consisting of a long train of rollers. The plate deposits the thin film of ink upon the surface of a web of paper which, after leaving the printing press, travels past a source of intense heat which, by evaporating the solvent in the ink, causes the ink to "set."

A heat-set ink is so formulated that it will possess properties which will meet the requirements of the particular printing job for which it is designed. After those properties have been secured, they must be rigidly controlled. For instance, the viscosity and tack of the ink must be maintained within rather narrow limits; the period during which the ink can be dried must be very brief; the ink may not exhibit a tendency to smear or offset from the finished prints; and at times it must produce base prints which are susceptible to overprinting with other inks or with a varnish.

The requirement that the properties of an ink for a given printing job remain substantially constant, coupled with the comparatively long path traveled by the ink through the distributing system of a printing press, has imposed serious limitations upon the types of solvents which may be used in heat-set inks and the types of paper upon which they can be printed. The solvents which could be used have been limited to those having a vapor pressure so low at normal press room temperatures that, during the printing operation, there would be no substantial loss of solvent from the ink as it passed from the ink fountain to the printing cylinder. However, the use of such a solvent has required that the prints made therefrom be subjected to exceedingly high heat to volatilize the solvent and dry the print immediately. Thus, in large scale commercial printing, the paper web is often heated to 300° F. or more, at which temperature the paper loses moisture. This had prevented the use of the cheapest papers and even some of the intermediate papers give undesirable web rays. Furthermore, when a printing press employing high-speed inks was shut down, except for extremely brief periods, the solvent loss from the ink caused the ink to body on the press to such an extent that it was rendered unprintable upon the resumption of the printing operation. This has rendered it necessary for the pressman to wash up the press or supply solvent thereto and has resulted in substantial losses of paper.

We have discovered that it is possible to adjust automatically the rheological properties of a plastic material such as an ink of the heat-set type while the material is passing through a multi-roller distributing system. As a result, the foregoing disadvantages which have attended the use of heat-set inks in the past can be avoided; it is possible in formulating heat-set inks to employ solvents with lower boiling points than those which could be used previously; and it is possible, in the initial formulation of an ink of the heat-set type, to use a lesser quantity of solvent than that which is required to impart a sufficiently low viscosity to the ink on the printing cylinder. This last point is of importance in connection with the formulation of inks in which high concentration resin solutions are stable on storage but lower resin concentrations are not.

The rheological properties of a plastic material in a multi-roller distributing system are adjusted in accordance with our invention by detecting changes in the viscosity of the material on one of the rollers of the system and, when the detected change in viscosity increases above a predetermined value and until it falls below that value, by automatically adding solvent to the material at a point in its travel through the system which is in advance of the roller where the viscosity changes are detected. The apparatus which we have invented for accomplishing this contains means for detecting changes in the viscosity of the plastic material on one of the rollers of the distributing system. A nozzle provided with a control valve is directed toward a roller in the distributing system which is in advance of the roller where changes in the viscosity of the plastic material are detected, and means are provided for opening and closing that valve which are automatically actuated by the detecting means when the detected changes in viscosity exceed predetermined amounts.

Figures 1, 2, 3, 4 and 5 of the accompanying drawings are perspective illustrations of different embodiments of the invention. Fig. 6 is the rear elevation of a press assembly having an ink distribution system similar to that shown in Fig. 1.

Referring in more detail to the drawings and specifically to Fig. 1, the numerals 10 to 23, inclusive, illustrate the ink distribution system of a typical printing press, consisting of an ink fountain 10, a fountain feed roller 11, the intermediate rollers 12 to 19, the form rollers 20 to 22 and the plate cylinder 23. According to well-known principles employed in such printing presses, the rollers 11, 13, 16, 17 and 19 are synchronously rotated by an outside power source. These rollers are usually made from metal. The balance of the rollers, usually made from a composition, are driven by the power-operated rollers. As indicated by the rotatably mounted angle bracket 24, connecting the shafts of rollers 12 and 14, this roller pair is positioned in such a manner that the roller 12 is alternately in contact with the fountain feed roller 11 and with the transfer roller 13, while the roller 14 alternately contacts the transfer roller 13 and the distribution roller 16. In addition, in printing presses of the herein illustrated type, the rollers 16, 17 and 19 are to oscillate along their axes to assure a more even distribution of the ink on these and on the subsequent rollers.

For purposes of this invention, there is added, in this specific embodiment, an auxiliary roller 30, located in contact with and underneath the bottom form roller 22, but preferably not directly below. This auxiliary roller is cradled in a balancing system, arranged to pivot about the shaft 31 and consisting of two horizontal bars 32, two vertical bars 33, a weight 34 and a second weight 35. The shaft of the auxiliary roller is mounted at 36, at one end of the horizontal bars, preferably by means of low-friction bearings, while the weight 34 is held between the other ends of the horizontal bars. The latter are pivotally joined at 37 to the vertical bars and the mass of weight 34 is adjusted in such a manner that the auxiliary roller is excessively counterbalanced, to exert an upward force against the form roller 22. For example, with the form roller having a diameter of 3 inches and an effective length of 24 inches, we found that the auxiliary roller pressing with 5 to 10 pounds against the form roller was about adequate.

The weight 35 is held between the lower ends of the vertical bars. The purpose of this weight is to provide a variable restoring torque which acts in opposition to the torque produced by the viscous resistance of the ink film at the line of contact between the rotating rollers. The mass of this weight is limited on the one-hand by the requirement that during the operation of the press the roller 30 be held at a dynamic equilibrium position which is angularly displaced with respect to its static equilibrium position. On the other hand, the mass of this weight is limited by the requirement that the roller 30 be not permitted to reach a position whereby its center approaches a line connecting the center of roller 22 with the center of pivot 37.

Every dynamic equilibrium position of roller 30 corresponds to a specific angular orientation of the bar 33 which is pivoted at 31. This orientation provides a means for controlling, say, the spray of solvent onto one of the rolls of the printing press. For this purpose, the rods 40, 41 and 42 are linked to each other and to the lower end of bar 33 as shown. The rod 41 is pivotally held by the shaft 43 and the rod 42 is mechanically restrained to a linear reciprocating motion by the track 44. Moreover, the rods 41 and 42 are linked together so as to compensate for small variations in length required of rod 41. Like the shaft 36 of the auxiliary roller 30, the pivots 31, 37 and 43 are mounted in low-friction bearings. As a result of this arrangement, the rod 42 is moved to the left whenever the auxiliary roller 30 attains an equilibrium position corresponding to a higher torque exerted thereon, and to the right when the auxiliary roller drops to a lower equilibrium position. The rod 42 has an electric contact 50 attached to its free end. This contact is arranged to slide over the surface of a disk 51, made from a non-conducting material with a conducting inlay 52 having approximately the shape of a four-cusped hypocycloid as shown. The disk is driven about its center at a speed of, say, 1 to 60 R. P. M., either by a separate motor 53 as shown, or by direct coupling to one of the rollers of the printing press. Electric circuits connect a power supply 54 to a transformer 55, for the purpose of avoiding dangerous voltages. One terminal of the transformer is connected to the conducting inlay of the disk and the other through a relay coil 56 to the contact 50. Another circuit including a power source 57 and the contacts of relay 56 is provided to actuate a solenoid valve 60 regulating the intake of compressed air at 61 to operate a spraying device 62, fed by means of the conduit 63 and spraying a suitably shaped jet of mist onto one of the rollers. In this specific embodiment the location of the spraying device has been chosen to provide a spray to roller 13. The location of the spray is not critical, but is preferably as distant as possible from the form rollers to assure efficient mixing.

The disk 51 is made adjustable in its position relative to the contact 50; either alone or jointly with the motor 53. In the alternative, the position of pointer 50 can be made adjustable in its relation to the disk by providing for a change in the effective length of either the rod 42 or the rod 40, as shown, for example, by means of the turnbuckle 45.

Assuming that the roller 30 has attained a given equilibrium while the press is in operation and that the relative position of the disk and the contact has been adjusted so that the contact rides on the peripheral portion of the revolving disk, just missing the cusps of the conducting inlay, the moment the roller 30 changes to an equilibrium corresponding to higher viscous torque, the contact moves toward the center of the disk and, as the disk revolves, crosses over the cusps of the conducting inlay. The circuit closes every time the contact touches a conducting portion on the disk and short bursts of spray will be emitted by the spraying device. Obviously, when the roller 30 reaches a certain, still higher equilibrium, the intermittent spray will change to a continuous spray until a change in the physical condition of material reaching the form roller 22, due to the added spray, lowers the point of equilibrium and causes the spray to become intermittent and eventually to cease altogether when the desired ink characteristics have been attained.

Figure 2:
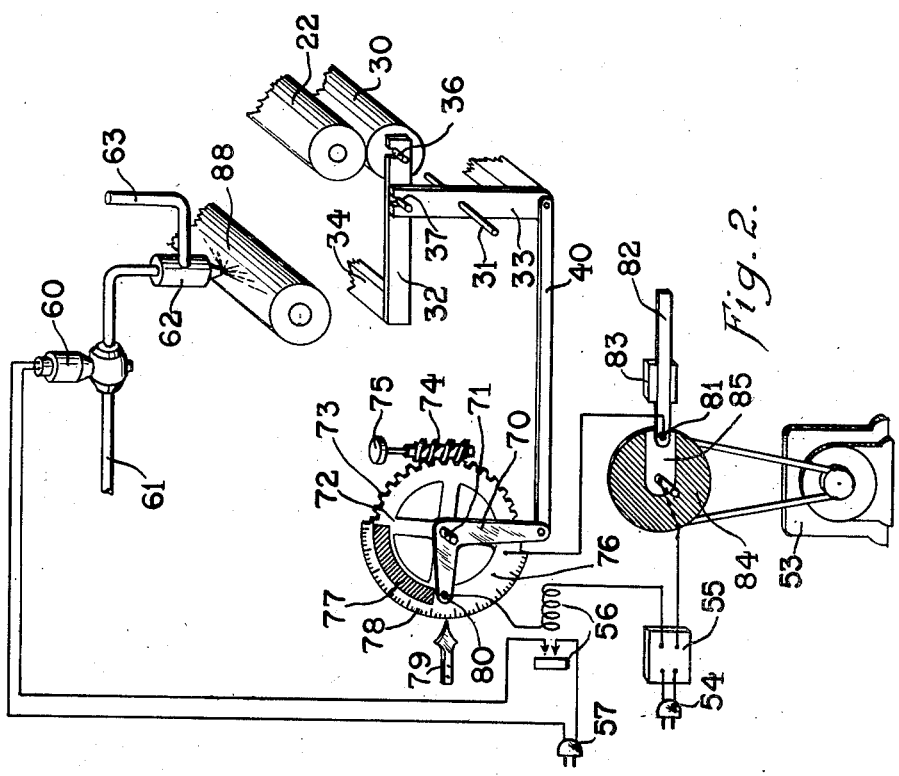

The embodiment shown in Fig. 2 permits a more accurate control and is designed to actuate the spray device at greater time intervals. The arrangement of the auxiliary roller 30 and the take-off system is similar to that in Fig. 1. However, instead of linking other rods to the rod 40, an angle arm 70 is linked to one end of this rod. This angle arm is pivoted at 71 so as to rotate with a minimum of friction. Arranged in close proximity to and behind the angle arm is a wheel 72 and worm 74. The axis of the wheel is co-linear but independent of the arm pivot 71. As shown, one-half of the rim of the wheel is subdivided into a conducting area 76 and a non-conducting area 77 and is extended to provide an angular scale at its periphery, opposing which is the fixed indicating pointer 79. The teeth 73 of the aforementioned wheel in engagement with worm 74 permit one to adjustably shift the position of the conducting and non-conducting area with respect to the fixed indicating pointer. The angle arm 70 has a contact 80 at one end, arranged to slide over the conducting and non-conducting area. Electrical connections are provided which make the contact point and the conducting area part of a circuit comprising a power source 54, a transformer 55 and the coil of a relay 56. Included in the circuit is another contact 81, attached to one end of a rod 82 which is fitted into a track 83 and arranged to be manually adjusted along a line passing through the axis of rotation of a disk 84 and through the center of the rod 82. The contact 81 is fitted so as to slide over the disk 84 which is made from a non-conducting material having a conducting inlay 85 as shown. Depending upon the specific requirements, this conducting area can be of different size and shape with the obvious exception that it should not be given the shape of a segment of the disk since in this case any change of the position of the contact on the disk would not result in a change of the time periods at which the electric circuit is open and closed. The disk is rotatably driven about its center by a motor 53, or is geared to one of the rollers of the printing press. Circuit elements connect one terminal of the above-mentioned transformer 55 with the conducting inlay of the disk 84. Another circuit including a power source 57 and the contact of the aforementioned relay 56 is provided to actuate a solenoid valve 60 regulating the intake of compressed air at 61 to operate a spraying device 62 fed by means of a conduit 63. The roller 88 shown underneath the spraying device represents one of the rollers of a printing press suitably selected for the disclosed purpose.

Figure 3:
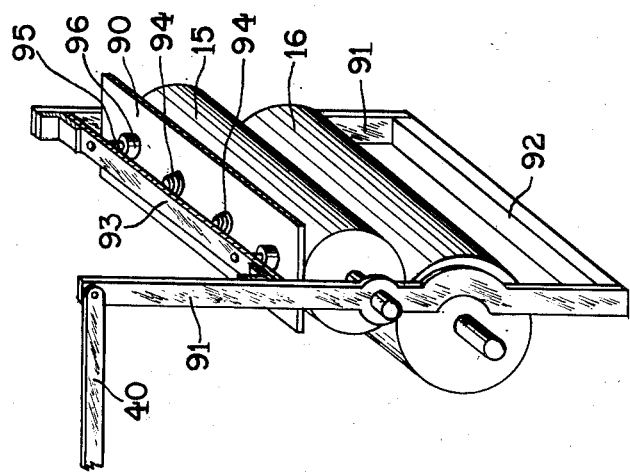

Fig. 3 represents a different embodiment of the take-off device. Instead of an auxiliary roller 30 contacting a form roller 22 from underneath, as shown in Fig. 1 and 2, a contacting plate 90 is placed on top of one of the rollers in a printing press, say, on top of the roller 15 of Fig. 1. The plate is held in position by a framework comprising the bars 91 and the weight 92. The functions of this weight 92 are essentially the same as that of the weight 35 shown in Fig. 1. The shaft of roller 15 about which the framework rotates must be either extended for the framework to clear the shaft and gears of roller 16 which is located underneath the roller 15, or the bars 91 of the framework must be shaped as shown. In order to provide the necessary force at which the plate 90 presses against the roller, a bar 93 is positioned above the plate and bracketed to the bars 91. The springs 94, inserted between the bar 93 and the plate provide the said force. In order to keep the plate rigidly in position while the press is operated, pins such as shown at 95 are provided, which fit into casings 96.

The rod 40 linked to the upper end of one of the bars 91 permits a take-off similar to that shown in Fig. 1 or Fig. 2.

Figure 4:
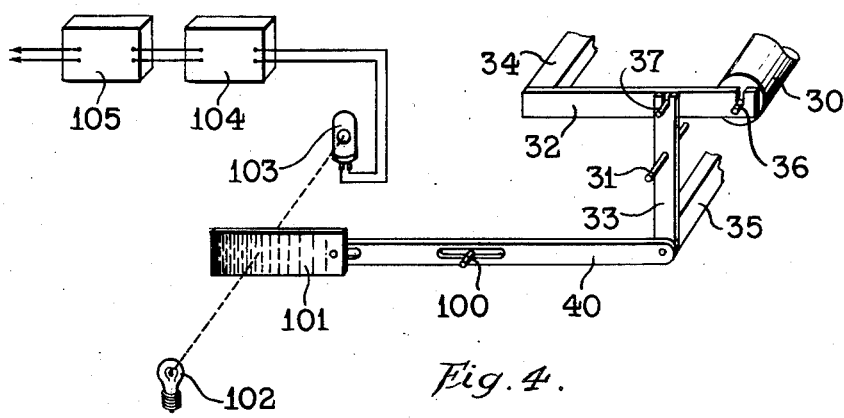

Fig. 4 illustrates an embodiment of the invention wherein each change in the angular orientation of the bar 33 alters the magnitude of an optical signal which is converted into an electrical signal that is then used to actuate the solvent addition system. For this purpose, an optical density wedge 101 is adjustably attached to one end of the rod 40 which, at the other end, is linked to the bar 33 as shown. In order to keep the rod and the wedge in position and to restrict them to substantially linear movements in response to angular changes in the position of bar 33, the rod is provided with guiding means, such as the slot and guide 100 shown in the drawing. The density wedge is located in a beam of light emitted by the light source 102 and directed at the photoelectric tube 103 the output of which depends upon the amount of incident light and, therefore, upon the position of the wedge. After the photoelectric signal has been amplified at 104, it is fed to a suitable control 105 which, in accordance with known principles, opens or throttles a solvent spray in conformance with the rheological changes at the take-off.

A more simple device comprises an opaque flag which is positioned to move in and out of the beam in response to changes in the angular orientation of bar 33. In this instance the electrical circuit is adjusted in such a manner that the spraying device starts to operate on a signal corresponding to a predetermined minimum of light reaching the photoelectric cell and ceases operation if the amount of light is reduced below this minimum.

Figure 5:
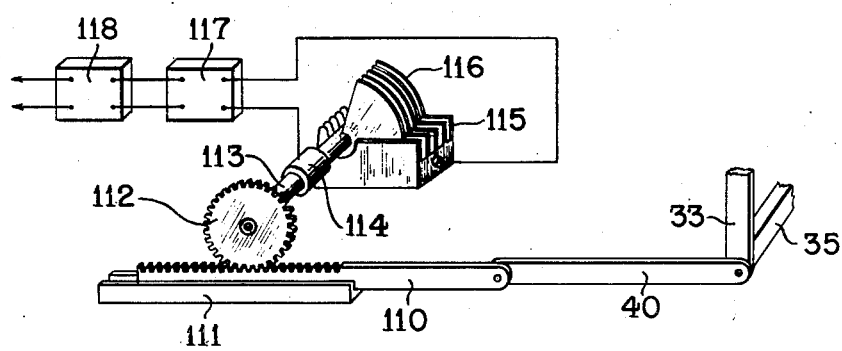
Figure 6:
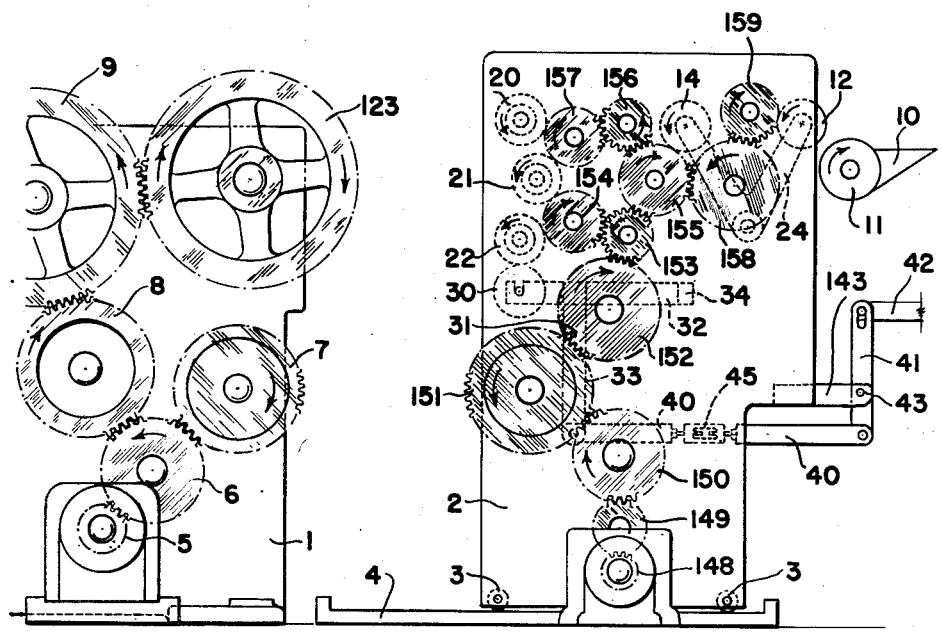

According to the embodiment shown in Fig. 5, changes in the angular orientation of bar 33 are converted into frequency changes of an oscillating circuit which, in turn, are used for actuating the afore-described solvent addition system. A rack 110, guided in its movements by the rail 111, is pivotally linked to the rod 40. Geared to the rack is the pinion 112 which, by means of the shaft 113 held by sleeves such as shown at 114, is attached to a variable capacitor comprising the plates 115 that are fixedly mounted, and the plates 116 that are rotatably mounted on shaft 113. This capacitor is part of an oscillator 117, connected to a filter and amplifier 118. The frequency of the oscillator varies at a function of the capacitance. Changes in the rheological properties at the point of take-off cause the pinion to rotate which alters the relative position of adjacent condenser plates and produces frequency changes in the oscillating circuit. By altering the inductance or capacitance of the filter in conventional manner, say, by means of a control knob which has been calibrated according to the rheological requirements, frequency control can be imposed upon the operation of a relay which actuates the solvent spray and which, depending upon the specific task, is adjusted to be normally open or normally closed. It is obvious that, in lieu of capacitance modulations in an oscillating circuit, changes in the inductance or resistance caused by variations in the rheological properties at the point of take-off can be used to produce the same effect.

Other means of controlling the rheological properties of plastic materials on a multi-roller distributing system according to the herein disclosed invention comprise piezoelectric crystals in operative alignment with the bar 33. In opposing the motion of the latter, such crystals develop a voltage in direct relation to the opposing force. Or the changes in the position of bar 33 are transmitted to a selsyn which actuates a synchronized selsyn controlling the solvent spray.

Fig. 6 is a side elevation of a printing press comprising the ink distributing system shown in Fig. 1, as well as the herein claimed control device. More specifically, the drawing illustrates a power source 5 and the gear trains by means of which a press of the described type is customarily set in motion. In addition, a new and separate power drive for the inking rollers is shown which allows shutdowns of the press without the need of cleaning before the operation is resumed and eliminates paper waste because the ink on the rollers is maintained at proper consistency while the press is idle.

Presses of this type are constructed in such a manner that the ink distributing assembly can be moved away from the plate cylinder and the paper feed elements to make the press more accessible in cleaning. For this purpose, the plate cylinder and paper feed elements are suitably mounted between two stationary side frame portions 1, while the ink distributing elements are mounted between the side frame portions 2 which are supported by roller coasters 3 set onto the tracks 4. This arrangement permits one to move the ink distributing elements out of contact with the plate cylinder 23 (Fig. 1) and to disengage the gears 7 and 151 which actuate the gear train of the ink distributing rollers.

Prior to this invention, when printing was to be resumed after a shutdown, the operator moved the ink distributing system into the position shown on the drawing. Thereby he gained access to the rollers and, while turning them over by means of a wrench, was able to clean them of ink which, because of the shutdown, had become dry and unsuitable for printing. In the alternative, printing was sometimes resumed without cleaning the rollers. This, however, entailed a waste of paper since the operation produced unsuitable prints until the ink on the rollers attained the required consistency.

To a printing press of the described type, fitted with the control device of this invention, we have added the stationary motor 148 actuating the gears 149 and 150 suitably attached thereto. This enables us to resume printing immediately after a shutdown, regardless of what duration, without the necessity of cleaning the rollers or of discarding prints until the ink on the distributing system has regained the proper consistency. Upon a stop in the operation, the ink distributing assembly is moved away from the plate cylinder and the paper feeding device in the same manner as prior to this invention. However, as soon as the ink distributing assembly reaches a position whereby the gears 150 and 151 engage each other, the motor 148 is started, say, automatically by means of a trip switch. Simultaneously, the ink supply from the fountain 10 is cut off so as to prevent the accumulation of excessive ink on the distributing system. This can easily be done by lifting up the pawl of the pawl and ratchet drive which is customarily employed for turning the fountain feed roller 11. Instead of being at a standstill while work is performed at the paper feed end of the press, the ink distributing rollers are being turned over, preferably at a speed approximating the speed of operation. As a result, the consistency of the ink on the rollers is continuously adjusted by the controlling device.

In order to resume printing, the ink distributing assembly is simply moved into engagement with the plate cylinder and the ink supply from the fountain is started up again.

It is obvious that the afore-described devices will be useful in conjunction with processes other than printing. For example, they can be adapted to regulate the amount of heat supplied to rollers of a distribution system for thermoplastic materials.

Having described our invention, we claim:

1. The combination, with a multi-roller distributing system for plastic material, of apparatus for adjusting the rheological properties of the plastic material therein, comprising means for detecting changes in the viscosity of plastic material on one of the rollers of the system, a nozzle directed toward another of the rollers in said system in advance of the first-named roller and connected with a supply of solvent for said plastic material, a valve controlling the supply of solvent to said nozzle, and means automatically actuated by said detecting means for opening and closing said valve when the detected viscosity changes exceed predetermined amounts.

2. The combination, with a printing press having a multi-roller distributing system, of apparatus for adjusting the rheological properties of printing ink therein, comprising means for detecting changes in the viscosity of printing ink on one of the rollers of the system, a nozzle directed toward another of the rollers in said system in advance of the first-named roller and connected with a supply of solvent for said printing ink, a valve connecting the supply solvent to said nozzle, and means automatically actuated by said detecting means for opening and closing said valve when the detected viscosity changes exceed predetermined amounts.

3. The combination, with a printing press having a multi-roller distributing system, of apparatus for adjusting the rheological properties of printing ink therein, comprising a control member mounted for movement along a limited path in tangential contact with the surface of one of the rollers in the distributing system and whose position on said path is governed by the viscosity of the printing ink on said roller as said ink is fed through the system, a nozzle directed toward another of the rollers in said distributing system in advance of the first-named roller and connected with a supply of solvent for said printing ink, a valve controlling the supply of solvent to said nozzle, and an arm linked with said control member so that its position is shifted as the control member moves along its path and connected with said valve so that the valve is actuated when said arm is moved to a predetermined position by said control member.

4. The combination, with a printing press having a multi-roller distributing system, of apparatus for adjusting the rheological properties of printing ink therein, comprising a control member mounted for movement along a limited path in tangential contact with the surface of one of the rollers in the distributing system and whose position on said path is governed by the viscosity of the printing ink on said roller as said ink is fed through the system, a nozzle directed toward another of the rollers in said distributing system in advance of the first-named roller and connected with a supply of solvent for said printing ink, a solenoid valve controlling the supply of solvent to said nozzle, a rotary disc whose surface contains a non-conducting area and a conducting area, an arm linked with said control member so that its position is shifted as the control member moves along its path, an electric contact mounted on said arm and adapted to slide over the surface of said disc, and an electric circuit adapted to cause said valve to open when said contact slides over said conducting area.

5. The combination, with a multiple roller distributing system for plastic material, of apparatus comprising a member having a surface in tangential contact with one of the rollers of the distributing system, a balancing structure cradling the said member, said balancing structure being pivotally arranged for permitting rotation of the member in co-action with the roller about the axis of the said roller and for assuming an angular orientation specific for every degree of rotation of the said member about the axis of the said roller, in conjunction with the said balancing structure means providing a force pressing the said member against the said roller, means providing a static equilibrium position of the said member with respect to the said roller and a force in opposition to the torque produced by plastic material passing between the said member and the said roller, means for altering the torque produced by plastic material passing between the said member and the said roller, and means responsive to a change in the angular orientation of the said balancing structure proportional to a predetermined torque increment which are adapted to actuate the said means for altering the torque.

6. The combination according to claim 5, wherein the said member having a surface in tangential contact with one of the rollers of the distributing system is a cylinder rotatable about its axis.

7. The combination according to claim 5, wherein the said member having a surface tangential contact with one of the rollers of the distributing system is a plate.

8. The combination according to claim 5, wherein the said means responsive to a change in the angular orientation of the balancing structure comprise a photoelectric tube, a light source throwing a beam of light at the photoelectric tube, a lever arranged to respond with a substantially linear motion to every change in the angular orientation of the said balancing structure, an optical density wedge attached to the free end of this lever and suitably positioned in the said beam, an amplifier for the output of the photoelectric tube and a control which is governed by the amplified output and actuates the said means for altering the torque.

9. The combination according to claim 5, wherein the said means responsive to a change in the angular orientation of the balancing structure comprise an oscillating circuit including a variable capacitor, a lever arranged to respond with a substantially linear motion to every change in the angular orientation of the balancing structure, a rack attached to the free end of this lever, a pinion geared to the rack and operatively connected with the said variable capacitor, a filter adapted to impose frequency response limitations upon the oscillator output, an amplifier connected to the filter, and a relay which is governed by the amplified filter output and actuates the said means for altering the torque.

10. The combination, with a multiple roller printing press, of apparatus comprising a member having a surface in tangential contact with one of the rollers of the printing press, a framework cradling the said member, said framework being pivotally arranged for permitting rotation of the member in co-action with the roller about the axis of the said roller and for assuming an angular orientation specific for every degree of rotation of the said member about the axis of the said roller, in conjunction with the said framework means providing a force pressing the said member against the said roller, means providing a static equilibrium position of the said member with respect to the said roller and a force in opposition to the torque produced by printing ink passing between the said member and the said roller, a lever arranged to respond with a substantially linear motion to every change in the angular orientation of the said framework, a plate having a non-conducting area and a conducting area, an electric contact at the free end of the said lever adopted to slide over the plate, a spraying device directing a spray at one of the rollers located in advance of the said roller, and an electric circuit arranged to actuate the spraying device when the said contact slides over the conducting area of the said plate.

11. The combination, with a multiple roller printing press, of apparatus comprising a cylinder in contact with one of the form rollers of the printing press, a framework cradling the shaft of the said cylinder, said framework being pivotally arranged for permitting rotation of the cylinder in co-action with the said form roller about the axis of the said form roller and for assuming an angular orientation specific for every degree of rotation of the said cylinder about the axis of the said form roller, in conjunction with the said framework a first weight pressing the said cylinder against the said form roller, another weight providing a static equilibrium position of the said form roller and a variable force in opposition to the torque produced by printing ink passing between the said cylinder and the said form roller, a lever system arranged to respond with a linear motion to every change in the angular orientation of the said framework, an electric contact at the free end of the said lever system, a rotatably mounted disk facing the said contact, said disk having a non-conducting area and a conducting inlay area preferably shaped so as to permit the said contact to close a circuit first intermittently for increasingly longer periods and then continuously as the contact moves from the periphery of the rotating disk toward the center of the rotating disk in response to predetermined torque increments, a solenoid-operated spraying device directing a spray of solvent at one of the rollers of the printing press located in advance of the said form roller, and an electric circuit arranged to actuate the spraying device when the said contact slides over the conducting area of the said disk.

12. The combination, with a multiple roller printing press, of apparatus comprising a cylinder in contact with one of the form rollers of the printing press, a framework cradling the shaft of the said cylinder, said framework being pivotally arranged for permitting rotation of the cylinder in co-action with the said form roller about the axis of the said form roller and for assuming an angular orientation specific for every degree of rotation of the said cylinder about the axis of the said form roller, in conjunction with the said framework a first weight pressing the said cylinder against the said form roller, another weight providing a static equilibrium position of the said form roller and a variable force in opposition to the torque produced by printing ink passing between the said cylinder and the said form roller, a lever system arranged to respond with an angular motion to every change in the angular orientation of the said framework, a first electric contact at the free end of the lever system, a wheel having a non-conductive strip and a conductive strip at the rim in operative alignment with the said contact and a scale at the edge of the rim adjacent to the said strips, a fixed indicating pointer facing the said scale, means for adjustably turning the said wheel, a rotatably mounted disk having a non-conductive area and a conductive area, a second electric contact adapted to slide over the disk and to be manually changed in its position relative to the rotating disk to intermittently close an electric circuit for periods of time depending upon the shape of the conducting area of the disk and the position of the said second electric contact, a solenoid-operated spraying device directing a spray of solvent at one of the rollers of the printing press located in advance of the said form roller, and an electric circuit arranged to actuate the spraying device when the said first electric contact slides over the conductive strip of the wheel and the said second electric contact slides over the conductive area of the rotating disk.

13. The combination, with a printing press having a multiple roller ink distributing system adapted to be moved from a station in contact with the plate cylinder and the power source for running the press to a station out of contact with the plate cylinder and the power source for running the press, of a separate power source operating the ink distributing system when moved to the station out of contact with the said plate cylinder and the said power source for running the press, of means for cutting off the ink supply to the said distributing system when in engagement with the said separate power source, and of apparatus fitted to move with the ink distributing system for adjusting the rheological properties of ink thereon, the said apparatus comprising means for detecting changes in the viscosity of printing ink on one of the rollers of the system, a nozzle directed toward another of the rollers in said system in advance of the first-named roller and connected with a supply of solvent for said printing ink, a valve connecting the supply solvent to said nozzle, and means actuated by said detecting means for opening and closing said valve when the detected viscosity changes exceed predetermined amounts.

References Cited in the file of this patent

UNITED STATES PATENTS

| | | |
|---|---|---|
| 1,678,091 | Wilhelm | July 24, 1928 |
| 1,837,702 | Canfield | Dec. 22, 1931 |
| 2,101,322 | Reed | Dec. 7, 1937 |
| 2,121,045 | Paynter | June 21, 1938 |
| 2,262,573 | Bender | Nov. 11, 1941 |
| 2,347,619 | Taylor et al. | Apr. 25, 1944 |
| 2,590,538 | Huck | Mar. 25, 1952 |